United States Patent
Lee

(10) Patent No.: US 11,639,179 B2
(45) Date of Patent: *May 2, 2023

(54) APPARATUS AND METHOD FOR ENSURING FAIL-SAFE FUNCTION OF AUTONOMOUS TRAVELING SYSTEM

(71) Applicant: Hyundai Mobis Co., Ltd., Seoul (KR)

(72) Inventor: Je Young Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,476

(22) Filed: Sep. 17, 2021

(65) Prior Publication Data

US 2022/0005293 A1 Jan. 6, 2022

Related U.S. Application Data

(63) Continuation of application No. 16/554,722, filed on Aug. 29, 2019, now Pat. No. 11,151,809.

(30) Foreign Application Priority Data

Sep. 12, 2018 (KR) ......................... 10-2018-0108982

(51) Int. Cl.
*B60W 50/02* (2012.01)
*G07C 5/08* (2006.01)
(Continued)

(52) U.S. Cl.
CPC ....... *B60W 50/0205* (2013.01); *G05D 1/0088* (2013.01); *G05D 1/0268* (2013.01); *G07C 5/0808* (2013.01); *G05D 2201/0213* (2013.01)

(58) Field of Classification Search
CPC .. B60W 50/0205; B60W 50/14; B60W 50/02; B60W 2050/0215;
(Continued)

(56) References Cited

U.S. PATENT DOCUMENTS 6,434,457 B2 8/2002 Okita et al.
2009/0198408 A1 8/2009 Salman et al.
(Continued)

FOREIGN PATENT DOCUMENTS

JP 2000-272498 10/2000
KR 10-2015-0080336 7/2015
(Continued)

OTHER PUBLICATIONS

Non-Final Office Action dated May 13, 2021, issued to U.S. Appl. No. 16/554,722.

(Continued)

*Primary Examiner* — Michael J Zanelli
(74) *Attorney, Agent, or Firm* — H.C. Park & Associates, PLC

(57) ABSTRACT

An apparatus for ensuring a fail-safe function of an autonomous traveling system may include: a dead reckoning (DR) information input unit configured to receive plural pieces of sensing information outputted from a plurality of sensors mounted in a vehicle as DR information; an identification value calculation unit configured to calculate an identification value for determining whether the respective pieces of sensing information inputted through the DR information input unit are fails; and a fail determination unit configured to determine whether the plural pieces of sensing information inputted through the DR information input unit are fails, using the identification value calculated through the identification value calculation unit, wherein the identification value calculation unit is configured to calculate the identification value for determining whether the pieces of sensing information are fails, using a rule-based method.

10 Claims, 12 Drawing Sheets

(51) Int. Cl.
*G05D 1/00* (2006.01)
*G05D 1/02* (2020.01)

(58) Field of Classification Search
CPC ... B60W 2050/021; B60W 2050/0292; B60W 2050/143; B60W 30/14; B60W 2520/14; B60W 2520/28; B60W 2540/18; B60W 60/0015; G05D 1/0088; G05D 1/0268; G05D 1/0055; G05D 2201/0213; G07C 5/0808; G01C 21/165; B60Y 2400/3032
See application file for complete search history.

(56) References Cited

U.S. PATENT DOCUMENTS

2011/0066321 A1 3/2011 Bechtler et al.
2019/0291742 A1 9/2019 Leach et al.

FOREIGN PATENT DOCUMENTS

KR 10-2017-0107767 9/2017
KR 10-2018-0055433 5/2018

OTHER PUBLICATIONS

Notice of Allowance dated Jun. 25, 2021, issued to U.S. Appl. No. 16/554,722.
Korean Office Action dated May 18, 2022, in Korean Patent Application No. 10-2018-0108982.

○ : Past Position Determination Result
● : Current Position Determination Result
○ : Estimated Position Determination Result
○ : Distribution Chart or Distribution Region ○ : Past Position Determination Result
● : Current Position Determination Result
○ : Estimated Position Determination Result
○ : Distribution Chart or Distribution Region ○ : Past Position Determination Result
● : Current Position Determination Result
◌ : Estimated Position Determination Result
○ : Fail Allowable Error Range
○ : Distribution Chart of Estimated Position Determination Results ○ : Past Position Determination Result
● : Current Position Determination Result
○ : Estimated Position Determination Result
○ : Fail Allowable Error Range
○ : Distribution Chart of Estimated Position Determination Results ○ : Position Determination Result of Sensor #1
◎ : Position Determination Result of Sensor #2
⊗ : Position Determination Result of Sensor #3
○ : Fail Allowable Error Range
○ : Presence Region of Fail Sensor ◐ : Position Determination Result of Sensor #1
◑ : Position Determination Result of Sensor #2
⊗ : Position Determination Result of Sensor #3
○ : Fail Allowable Error Range
○ : Presence Region of Fail Sensor

APPARATUS AND METHOD FOR ENSURING FAIL-SAFE FUNCTION OF AUTONOMOUS TRAVELING SYSTEM

CROSS-REFERENCES TO RELATED APPLICATION

This application is a continuation application of U.S. patent application Ser. No. 16/554,722, filed on Aug. 29, 2019, which claims priority from and the benefit of Korean Patent Application No. 10-2018-0108982, filed on Sep. 12, 2018, each of which is incorporated herein by reference in its entirety.

BACKGROUND

Field

Exemplary embodiments of the invention relate to an apparatus and method for ensuring a fail-safe function of an autonomous traveling system, and more particularly, to an apparatus and method for ensuring a fail-safe function of an autonomous traveling system, which can prevent utilization of wrong information by monitoring a fail in dead reckoning information is and thus further ensure and improve the reliability of the fail-safe function, in the autonomous traveling system which has the fail-safe function using the DR information to estimate robust position determination information capable of ensuring the reliability of position determination information.

Discussion of the Background

In general, an autonomous traveling system refers to a system that estimates the current position of a traveling vehicle based on position determination information and road map information which are constructed through the GPS and various sensors (for example, a radar, a LiDAR, a camera and the like), and controls autonomous traveling of the vehicle using the estimated current position information of the vehicle.

Examples of the position determination technology for estimating the current position of a vehicle in the autonomous traveling system may include satellite navigation, map matching and the like. In the position determination technology, the reliability of estimated position determination information is significantly changed depending on surrounding environments of the vehicle. The reduction in reliability of the position determination information may degrade the entire performance of the autonomous traveling system.

As such, the conventional position determination technology estimates relatively accurate position determination information, but does not ensure the reliability of the position determination information. Therefore, wrong position determination information is likely to be utilized in the autonomous traveling system.

Therefore, a fail-safe function for estimating robust position determination information is necessarily required to ensure the reliability of position determination information. Furthermore, the reliability of the fail-safe function needs to be ensured.

The related art of the present invention is disclosed in Korean Patent Application Laid-Open No. 10-2017-0107767 published on Sep. 26, 2017 and entitled "Vehicle Terminal Control System and Method".

The above information disclosed in this Background section is only for enhancement of understanding of the background of the invention and, therefore, it may contain information that does not constitute prior art.

SUMMARY

Exemplary embodiments of the present invention provide an apparatus and method for ensuring a fail-safe function of an autonomous traveling system, which can prevent utilization of wrong information by monitoring a fail in dead reckoning information and thus further ensure and improve the reliability of the fail-safe function, in the autonomous traveling system which has the fail-safe function using the DR information to estimate robust position determination information capable of ensuring the reliability of position determination information.

In one embodiment, an apparatus for ensuring a fail-safe function of an autonomous traveling system may include: a dead reckoning (DR) information input unit configured to receive plural pieces of sensing information outputted from a plurality of sensors mounted in a vehicle as DR information; an identification value calculation unit configured to calculate an identification value for determining whether the respective pieces of sensing information inputted through the DR information input unit are fails; a fail determination unit configured to determine whether the plural pieces of sensing information inputted through the DR information input unit are fails, using the identification value calculated through the identification value calculation unit; and a determination result output unit configured to combine fail determination results for the plural pieces of sensing information, obtained through the fail determination unit, and output the combined result as a final determination result.

The DR information input unit may receive one or more pieces of steering angle sensor (SAS) information, wheel speed sensor information, yaw rate sensor (YRS) information and gear information.

The identification value calculation unit may output a normal identification value and an error identification value as an identification value for determining a fail.

The identification value calculation unit may calculate the identification value for determining whether the sensing information is a fail, using a rule-based method and a model-based method.

According to the rule-based method, the identification value calculation unit may output a normal identification value when a plurality of preset conditions are all satisfied for each of the pieces of sensing information inputted through the DR information input unit, and output an error identification value when any one of the plurality of preset conditions is not satisfied.

The plurality of conditions may include one or more of: whether the sensing information is a normal diagnosis signal containing no noise; whether time required until the sensing information is collected is delayed by a designed specific time or more; whether the sensing information is out of a range between a preset maximum value and a preset minimum value; and whether the sensing information is a value that has been increased by more than a preset increment.

According to the model-based method, the identification value calculation unit may estimate a measurement value of a YRS designated as a specific sensor through Equation 1 below, compare an estimation value obtained by estimating the measurement value of the YRS to an actual measurement value collected by the YRS, output a difference value corresponding to a difference therebetween, and output a normal identification value or an error identification value as a final identification value depending on whether the difference value exceeds a designated threshold:

$$\psi_{est} = \frac{\sin(\theta_{SA}/G_{SAS})}{l_{wheel}} \times V_{wheel} \times D_{gear} \quad \text{[Equation 1]}$$

where $\theta_{SA}$ represents a steering wheel angle, $G_{SAS}$ represents a gear ratio, $l_{wheel}$ represents a wheel length, $V_{wheel}$ represents a wheel speed, $\psi_{est}$ represents a yaw rate estimation value, $\psi_{raw}$ represents a yaw rate measurement value, $D_{gear}$ represents a direction, and $T_{test}$ represents a difference value (test statistics).

The determination result output unit may output the fail determination result as: normal when the fail determination unit determines that all of the plural pieces of sensing information inputted through the DR information input unit are normal; a warning when results determined through a model-based method are close to a threshold within a designated range while results determined through a rule-based method are normal; and a fail when a fail occurs in one or more pieces of sensing information.

The identification value calculation unit, the fail determination unit and the determination result output unit may be integrated to function as a control unit.

In another embodiment, a method for ensuring a fail-safe function of an autonomous traveling system may include: receiving, by a control unit, plural pieces of sensing information outputted from a plurality of sensors mounted in a vehicle as DR information; calculating, by the control unit, an identification value for determining whether the respective pieces of sensing information received as the DR information are fails; determining, by the control unit, whether the plural pieces of sensing information received as the DR information are fail, using the calculated identification value; and combining, by the control unit, the fail determination results for the plural pieces of sensing information, and outputting the combined result as a final determination result.

The DR information may include one or more of SAS information, wheel speed sensor information, YRS information and gear information.

The control unit may output a normal identification value and an error identification value as an identification value for determining a fail.

The control unit may calculate the identification value for determining whether the sensing information is a fail, using a rule-based method and a model-based method.

According to the rule-based method, the control unit may output a normal identification value when a plurality of preset conditions are all satisfied for each of the pieces of sensing information inputted as the DR information, and output an error identification value when any one of the plurality of preset conditions is not satisfied.

The plurality of conditions may include one or more of: whether the sensing information is a normal diagnosis signal containing no noise; whether time required until the sensing information is collected is delayed by a designed specific time or more; whether the sensing information is out of a range between a preset maximum value and a preset minimum value; and whether the sensing information is a value that has been increased by more than a preset increment.

According to the model-based method, the control unit may estimate a measurement value of a YRS designated as a specific sensor through Equation 1 below, compares an estimation value obtained by estimating the measurement value of the YRS to an actual measurement value collected by the YRS, outputs a difference value corresponding to a difference therebetween, and outputs a normal identification value or an error identification value as a final identification value depending on whether the difference value exceeds a designated threshold:

$$\psi_{est} = \frac{\sin(\theta_{SA}/G_{SAS})}{l_{wheel}} \times V_{wheel} \times D_{gear} \quad \text{[Equation 1]}$$

where $\theta_{SA}$ represents a steering wheel angle, $G_{SAS}$ represents a gear ratio, $l_{wheel}$ represents a wheel length, $V_{wheel}$ represents a wheel speed, $\psi_{est}$ represents a yaw rate estimation value, $\psi_{raw}$ represents a yaw rate measurement value, $D_{gear}$ represents a direction, and $T_{test}$ represents a difference value (test statistics).

The control unit outputs the fail determination result as: normal when all of the plural pieces of sensing information inputted as the DR information are determined to be normal; a warning when results determined through a model-based method are close to a threshold within a designated range while results determined through a rule-based method are normal; and a fail when a fail occurs in one or more pieces of sensing information.

In accordance with the embodiments of the present invention, the apparatus and method for ensuring a fail-safe function of an autonomous traveling system can prevent utilization of wrong information by monitoring a fail in DR information and thus further ensure and improve the reliability of the fail-safe function, in the autonomous traveling system which has the fail-safe function using the DR information to estimate robust position determination information capable of ensuring the reliability of position determination information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
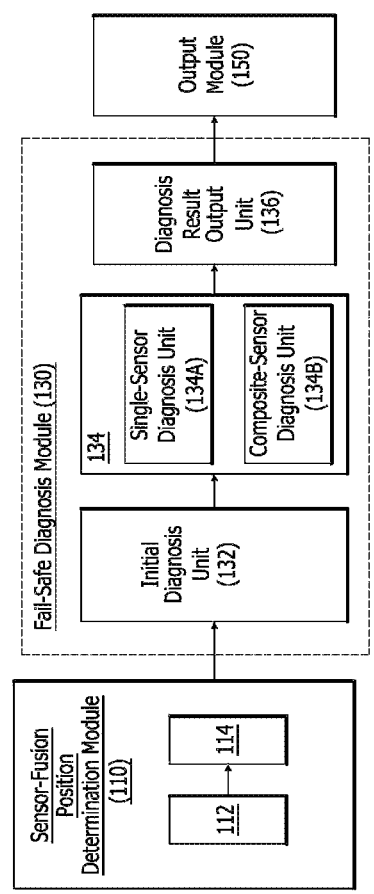
FIG. 1 is a block diagram illustrating an autonomous traveling system in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

FIG. 1 is a block diagram illustrating an autonomous traveling system in accordance with an embodiment of the present invention.

Referring to FIG. 1, the autonomous traveling system in accordance with the embodiment of the present invention may include a sensor-fusion position determination module 110, a fail-safe diagnosis module 130 and an output unit 150.

The sensor-fusion position determination module 110 may include a position determination sensor unit 112 and a position calculation unit 114. The position determination sensor unit 112 may serve to measure the current position of an autonomous traveling vehicle (hereafter, referred to as 'vehicle'), and include the same types of position determination sensors or different types of position determination sensors. Examples of the position determination sensors may include a GPS sensor, a radar sensor, a LiDAR sensor, a camera sensor and the like. The types of the position determination sensors are not limited, as long as they can measure the current position of the vehicle.

The position calculation unit 114 may fuse position values measured by the plurality of sensors, and match the fusion result with a road map which has been constructed in advance, thereby calculating a position determination result. The position determination result may include position information of the vehicle on the road map, traveling route information on s the road map, and lane information based on the traveling route information.

The fail-safe diagnosis module 130 may perform a fail-safe diagnosis for the position determination result inputted from the sensor-fusion position determination module 110. When diagnosing a fail or abnormality for the position determination result, the fail-safe diagnosis module 130 may output a warning message corresponding to the fail or abnormality. When diagnosing a safe for the position determination result, the fail-safe diagnosis module 130 may correct the position determination result. The fail-safe diagnosis module 130 will be described in detail below.

The output unit 150 may process the warning message into visual information, tactile information or a combination thereof, and output the processed information. The output unit 150 may process a map matching result into visual information, tactile information or a combination thereof and output the processed information, the map matching result being obtained by matching a normal position determination result passed according to the fail-safe diagnosis result of the fail-safe diagnosis module 130 or a position determination result recovered through a safe processing operation with the road map. The output unit 150 may include a video output module and an audio output module or a combination thereof.

Although not illustrated, the video output module may include an image processing unit for converting the warning message or the corrected position determination result into image data such as text data and graphic data, which can be outputted on an image screen, and a display unit such as an LCD for displaying the image data, and the audio output module may include an audio processing unit for converting the warning message or the corrected position determination result into audio data such as voice data and a speaker unit for outputting the audio data.

Hereafter, referring to FIGS. 2 to 4, the above-described fail-safe diagnosis module 130 will be described in detail.

The fail-safe diagnosis module 130 may include an initial diagnosis unit 132, a fail-safe diagnosis unit 134 and a diagnosis result output unit 136, in order to perform a fail-safe diagnosis for the position determination result inputted from the sensor-fusion position determination module 110.

Initial Diagnosis Unit 132

The initial diagnosis unit 132 may perform an initial diagnosis for position determination results inputted from the sensors of the sensor-fusion position determination module 110, that is, an initial fail-safe diagnosis by analyzing the frequency and distribution chart of the position determination results.

The frequency may be defined as the number of times (measurement count) that the position determination results are inputted from the position determination sensor for a preset time. The preset time may be set to various values depending on design, for example, 500 ms. That is, the initial diagnosis unit 132 may count the number of times that the position determination results are inputted for the preset time, compare the counted value to a preset count value (for example, five times), and diagnose whether a fail occurred in the position determination result, based on the comparison result. For example, the initial diagnosis unit 132 may determine that the initial diagnosis for the position determination results is a success, when the counted value is equal to or more than five, and determine that the initial diagnosis for the position determination results is a fail, when the counted value is less than five.

When the initial diagnosis for the frequency of the position determination results is completed, the initial diagnosis unit 132 may perform the initial diagnosis for the position determination results inputted from the sensor-fusion position determination module 110 based on the distribution chart of the position determination results.

Figure 2A:
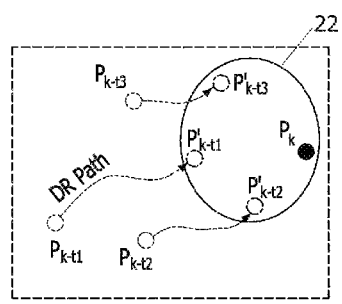
FIGS. 2A and 2B are diagrams illustrating an initial diagnosis process performed by an initial diagnosis unit based on a distribution chart of position determination results.

Hereafter, referring to FIG. 2A, the process of performing the initial diagnosis based on the distribution chart of the position determination results will be described.

First, the initial diagnosis unit 132 may collect past position determination results $P_{k-t1}$, $P_{k-t2}$ and $P_{k-t3}$, and estimate current position determination results by predicting the collected past position determination results $P_{k-t1}$, $P_{k-t2}$ and $P_{k-t3}$ at the current point of time. Hereafter, the estimated current position determination results $P'_{k-t1}$, $P'_{k-t2}$ and $P'_{k-t3}$ will be referred to as 'estimated position determination results'. As a method for obtaining the estimated position determination results from the past position determination results, dead reckoning (DR) may be used.

When the estimated position determination results $P'_{k-t1}$, $P'_{k-t2}$ and $P'_{k-t3}$ are obtained, the initial diagnosis unit 132 may calculate the standard deviation of distribution (distribution chart or distribution region) 22 or 24 indicating how far positions indicated by the estimated position determination results $P'_{k-t1}$, $P'_{k-t2}$ and $P'_{k-t3}$ and the current position determination result $P_k$ actually inputted from the sensor-fusion position determination module are away from one another.

Figure 2B:
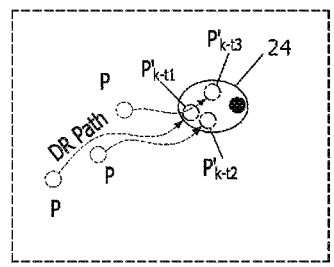

When the standard deviation is calculated, the initial diagnosis unit 132 may compare the calculated standard deviation to a specific threshold. The initial diagnosis unit 132 may determine that the initial diagnosis is a success, when the standard deviation is equal to or less than the specific threshold, and determine that the initial diagnosis is a fail, when the standard deviation exceeds the specific threshold. FIG. 2A illustrates the case in which the initial diagnosis is determined to be a fail, and FIG. 2B illustrates the case in which the initial diagnosis is determined to be a success. That is, the narrower the distribution of the estimated position determination results $P'_{k-t1}$, $P'_{k-t2}$ and $P'_{k-t3}$ and the current position determination result $P_k$, the higher the initial diagnosis is likely to be determined to be a success. When the initial diagnoses for the frequency and distribution chart of the position determination results are all determined to be successes, the initial diagnosis unit 132 may request the fail-safe diagnosis unit 134 to start a fail-safe diagnosis. If at least one of the initial diagnoses for the frequency and distribution chart of the position determination results fails, the fail-safe diagnosis performed by the fail-safe diagnosis module 130 may not be performed. The initial diagnosis process by the initial diagnosis unit 132 may be performed only once at first.

Referring back to FIG. 1, the fail-safe diagnosis unit 134 may perform a fail-safe diagnosis in response to a start request message (or start request command) for the fail-safe diagnosis from the initial diagnosis unit 132.

In order to perform the fail-safe diagnosis, the fail-safe diagnosis unit 134 may include a single-sensor fail-safe diagnosis unit 134A and a composite-sensor fail-safe diagnosis unit 134B.

Single-Sensor Fail-Safe Diagnosis Unit 134A

Figure 3A:
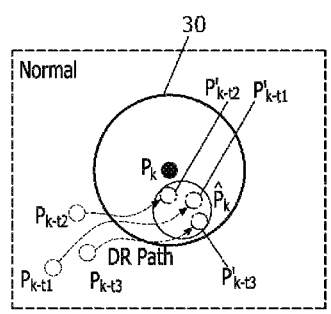
FIGS. 3A and 3B are diagrams illustrating a process in which a single-sensor fail-safe diagnosis unit of FIG. 1 performs a fail-safe diagnosis for a single sensor.
Figure 3B:
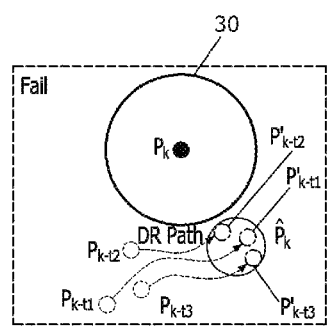

The single-sensor fail-safe diagnosis unit 134A may perform a fail-safe diagnosis for each of the single sensors. FIGS. 3A and 3B illustrate a process in which the single-sensor fail-safe diagnosis unit of FIG. 1 performs a fail-safe diagnosis for the single sensor. FIG. 3A illustrates the case in which the fail-safe diagnosis for the single sensor is determined to be a success, and FIG. 3B illustrates the case in which the fail-safe diagnosis for the single sensor is determined to be a fail.

In order to perform a fail-safe diagnosis for each of the single sensors, an identifier may be given to each of the single sensors.

The single-sensor fail-safe diagnosis unit 134A may collect past position determination results $P_{k-t1}$, $P_{k-t2}$ and $P_{k-t3}$ measured by a target single sensor through the above-described DR method, estimate position determination results $P'_{k-t1}$, $P'_{k-t2}$ and $P'_{k-t3}$ at the current point of time (hereafter, referred to as estimated position determination results) from the to collected past position determination results $P_{k-t1}$, $P_{k-t2}$ and $P_{k-t3}$, compare the estimated position determination results $P'_{k-t1}$, $P'_{k-t2}$ and $P'_{k-t3}$ to a current position determination result $P_k$ which is actually measured at the current point of time, and diagnose whether a fail occurs. At this time, a threshold for diagnosing whether a fail occurs may be set. The threshold may indicate an allowable error range 30 (hereafter, referred to as a fail allowable error range or a first fail is allowable error range) defined in the specification of the target single sensor, based on the current position determination result $P_k$.

According to the method for diagnosing whether a fail occurs in the target single sensor, the single-sensor fail-safe diagnosis unit 134A may determine that the fail-safe diagnosis is a success, when the entire distribution region (position distribution chart, distribution chart or first distribution chart) $\hat{P}_k$ of the estimated position determination results $P'_{k-t1}$, $P'_{k-t2}$ and $P'_{k-t3}$ is present in the fail allowable error range 30 as illustrated in FIG. 3A. When the fail-safe diagnosis is determined to be a success, the current position determination result $P_k$ may be decided as a normal position determination result.

On the other hand, when the entire distribution region of the estimated position determination results $P'_{k-t1}$, $P'_{k-t2}$ and $P'_{k-t3}$ is present outside the fail allowable error range 30 as illustrated in FIG. 3B, the single-sensor fail-safe diagnosis unit 134A may determine that the fail-safe diagnosis is a fail. When the fail-safe diagnosis is determined to be a fail, a safe processing operation may be performed. The safe processing operation may indicate an operation of recovering a position determination result determined to be a fail. For example, the single-sensor fail-safe diagnosis unit 134A may discard the current position determination result $P_k$, select any one of the estimated position determination results $P'_{k-t1}$, $P'_{k-t2}$ and $P'_{k-t3}$, and decide the selected position determination result as a position determination result obtained by recovering the discarded current position determination result $P_k$. Alternatively, the single-sensor fail-safe diagnosis unit 134A may create a figure connecting the positions indicated by the respective estimated position determination results $P'_{k-t1}$, $P'_{k-t2}$ and $P'_{k-t3}$, and decide the center position of the created figure as a position determination result obtained by recovering the discarded current position determination result $P_k$.

The reason to select any one of the estimated position determination results $P'_{k-t1}$, $P'_{k-t2}$ and $P'_{k-t3}$ as the position determination result obtained by recovering the discarded current position determination result $P_k$ is because the estimated position determination results $P'_{k-t1}$, $P'_{k-t2}$ and $P'_{k-t3}$ passed the initial diagnosis process performed at first.

Since at least the estimated position determination results $P'_{k-t1}$, $P'_{k-t2}$ and $P'_{k-t3}$ may be considered as normal position determination results, the safe processing operation of deciding recovery data using the estimated position determination results can be performed.

When a part of the distribution region (distribution chart) $\hat{P}_k$ of the estimated position determination results $P'_{k-t1}$, $P'_{k-t2}$ and $P'_{k-t3}$ is present in the fail allowable error range 30, the single-sensor fail-safe diagnosis unit 134A cannot determine that the fail-safe diagnosis is a perfect fail. Therefore, even in this case, the single-sensor fail-safe diagnosis unit 134A can determine that the current position determination result $P_k$ is as a normal position determination result, and may not perform the above-described safe processing operation for recovering a position determination result. However, the single-sensor fail-safe diagnosis unit 134A may diagnose this case as a warning condition in which an occurrence of abnormality is suspected.

When the fail-safe diagnosis is completed by the single-sensor fail-safe diagnosis unit 134A, the single-sensor fail-safe diagnosis unit 134A may transfer the position determination result of each of the single sensors, determined to be a success, or the position determination result recovered by the safe processing operation to the composite-sensor fail-safe diagnosis unit 134B, and simultaneously request the composite-sensor fail-safe diagnosis unit 134B to start a fail-safe diagnosis for the composite sensor.

Composite-Sensor Fail-Safe Diagnosis Unit 134B

Figure 4A:
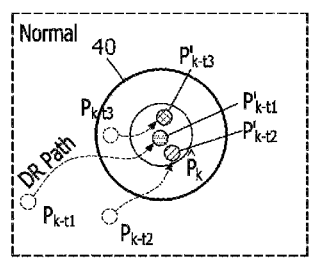
FIGS. 4A and 4B are diagrams illustrating a process in which a composite-sensor fail-safe diagnosis unit of FIG. 1 performs a fail-safe diagnosis for a composite sensor.
Figure 4B:
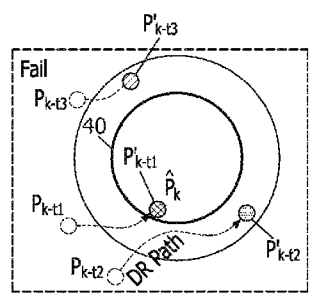

The composite-sensor fail-safe diagnosis unit 134B may perform a fail-safe diagnosis for a composite sensor including different types of single sensors, in response to the request of the single-sensor fail-safe diagnosis unit 134A. FIGS. 4A and 4B illustrate a process in which the composite-sensor fail-safe diagnosis unit of FIG. 1 performs a fail-safe diagnosis for the composite sensor. FIG. 4A illustrates the case in which the composite-sensor fail-safe diagnosis unit determines that fail-safe diagnoses for all single sensors included in the composite sensor are successes, and FIG. 4B illustrates the case in which the composite-sensor fail-safe diagnosis unit determines that a fail-safe diagnosis for only a certain single sensor among all of the single sensors included in the composite sensor is a success, and fail-safe diagnoses for the other single sensors are fails.

The fail-safe diagnosis process for the composite sensor may be similar to the above-described initial diagnosis process based on the distribution chart.

Under the supposition that the composite sensor includes first to third sensors #1 to #3, the respective sensors #1 to #3 may collect past position determination results $P_{k-t1}$, $P_{k-t2}$ and $P_{k-t3}$ which have been the most recently measured based on the current point of time, and estimate current position determination results $P'_{k-t1}$, $P'_{k-t2}$ and $P'_{k-t3}$ by predicting the collected past position determination results $P_{k-t1}$, $P_{k-t2}$ and $P_{k-t3}$ at the current point of time according to the DR method.

Then, the composite-sensor fail-safe diagnosis unit 134B may calculate the standard deviation of distribution chart $\hat{P}_k$ (distribution region, position distribution or second distribution chart) of the estimated position determination results $P'_{k-t1}$, $P'_{k-t2}$ and $P'_{k-t3}$, and compare the standard deviation to a threshold indicating a fail allowable error range 40 (second fail allowable error range). When the standard deviation is equal to or less than the threshold (FIG. 4A), that is, when all of the estimated position determination results $P'_{k-t1}$, $P'_{k-t2}$ and $P'_{k-t3}$ is are present in the fail allowable error range 40, the composite-sensor fail-safe diagnosis unit 134B may determine that all of the estimated position determination results $P'_{k-t1}$, $P'_{k-t2}$ and $P'_{k-t3}$ are successes. When the standard deviation exceeds the threshold, the composite-sensor fail-safe diagnosis unit 134B may determine that all of the estimated position determination results $P'_{k-t1}$, $P'_{k-t2}$ and $P'_{k-t3}$ are fails.

On the other hand, when the estimated position determination result $P'_{k-t1}$ obtained by predicting a position determination result, obtained by a certain sensor (hereafter, the first sensor #1) of the sensors #1 to #3 included in the composite sensor, at the current point of time is present in the fail allowable error range 40 as illustrated in FIG. 4B, the composite-sensor fail-safe diagnosis unit 134B may not determine that all of the estimated position determination results $P'_{k-t1}$, $P'_{k-t2}$ and $P'_{k-t3}$ are fails, but perform the safe processing operation to decide the estimated position determination result $P'_{k-t1}$ as estimated position determination results obtained by recovering the other estimated position determination results $P'_{k-t2}$ and $P'_{k-t3}$ determined to be fails. At this time, when a plurality of estimated position determination results are present in the fail allowable error range 40, the composite-sensor fail-safe diagnosis unit 134B may perform the safe processing operation to decide, as the recovered position determination result, the position determination result estimated through the sensor having the highest reliability among the respective sensors which have generated the plurality of estimated position determination results present in the fail allowable error range 40. The sensor having the highest reliability may be defined as the sensor having the smallest allowable error range among the allowable error ranges present in the specifications of the respective sensors. In order to identify the sensors present in the fail allowable error range, various geometric methods may be utilized.

Diagnosis Result Output Unit 136

Referring back to FIG. 1, when all of the fail-safe diagnoses for the single sensors and the composite sensor by the fail-safe diagnosis unit 134 are completed, the diagnosis result output unit 136 may provide a user with a message corresponding to the diagnosis result by referring to the following table in which the diagnosis result is classified into a plurality of fail levels.

TABLE 1

| Fail Level | Condition | Countermeasure | Availability |
| --- | --- | --- | --- |
| Level0 | Normal | Output normal | Available |
| Level1 | Abnormal | Issue warning | Available |
| Level2 | Fail occurs in some sensors | Safe processing | Available |
| Level3 | Fail occurs in all sensors | Fail processing | Not available |

Table 1 defines fail levels based on fail-safe diagnosis results in accordance with the embodiment of the present invention.

In an example, the fail levels may be classified into four stages. Level0 may s indicate the case in which the position determination results are normal. That is, Level0 may indicate the case in which the initial diagnosis and the fail-safe diagnoses for the single sensors and the composite sensor are all determined to be successes. Level1 may indicate the case in which an abnormality occurred. That is, Level1 may indicate the case in which the distribution region $\hat{P}_k$ of the estimated position determination results in the fail-safe diagnoses for the single sensors partially overlaps the fail allowable error range 30. Level2 may indicate the case in which a fail which can be recovered through the safe processing operation occurred during the fail-safe diagnosis. Level 3 may indicate the case in which a fail which cannot be recovered through the safe processing operation occurred. When a fail occurs at Levels0, Level1 and Level2, the position determination results may be available. However, when a fail occurs at is Level3, the position determination result may not be available, and the system may perform the initial diagnosis again.

Figure 5:
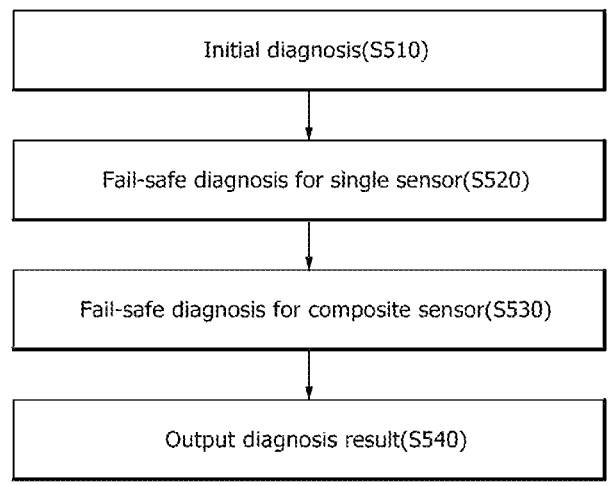
FIG. 5 is a flowchart illustrating a fail-safe diagnosis method for position determination results in the autonomous traveling system in accordance with the embodiment of the present invention.

FIG. 5 is a flowchart illustrating a fail-safe diagnosis method for position determination results in the autonomous traveling system in accordance with the embodiment of the present invention. When steps of the fail-safe diagnosis method are described, contents overlapping the contents described with reference to FIGS. 1 to 4 will be briefly described or omitted herein.

Referring to FIG. 5, the fail-safe diagnosis module 130 may perform the initial diagnosis for position determination results inputted from each of the single sensors included in the sensor-fusion position determination module 110 by analyzing the frequency and distribution chart of the position determination results, in step S510. The initial diagnosis may be performed once at first for each of the sensors.

As described above, the frequency may indicate the number of times (measurement count) that the position determination results are inputted from the position determination sensor for the preset time. For example, the fail-safe diagnosis module 130 may determine that the initial diagnosis for the position determination results is a success, when the measurement count is equal to or more than five, and determine that the initial diagnosis for the position determination results is a fail, when the measurement count is less than five.

When the initial diagnosis for the frequency is completed, the fail-safe diagnosis module 130 may perform the initial diagnosis based on the distribution chart of the position determination results. Specifically, the fail-safe diagnosis module 130 may calculate the standard deviation of distribution (distribution chart or distribution region) 22 or 24, indicating how far positions indicated by estimated position determination results $P'_{k-t2}$ and $P'_{k-t3}$ obtained by predicting past position determination results $P_{k-t2}$ and $P_{k-t3}$ at the current point of time and a current position determination result $P_k$ which is actually inputted from the sensor are away from one another, and compare the calculated standard deviation to a specific threshold.

The fail-safe diagnosis module 130 may determine that the initial diagnosis is a success, when the deviation is equal to or less than the specific threshold, and determine that the initial diagnosis is a fail, when the deviation exceeds the specific threshold.

When the initial diagnoses based on the frequency and distribution chart of the position determination results are determined to be successes, the fail-safe diagnosis module 130 may perform a fail-safe diagnosis for the single sensor by using a first distribution chart including the estimated position determination results obtained by predicting the past position determination results inputted from the single sensor after the initial diagnosis at the current point of time and the current position determination result inputted from the single sensor.

Specifically, the fail-safe diagnosis module 130 may perform a fail-safe diagnosis on the single sensor, based on a result obtained by comparing the standard deviation of the first distribution chart to the threshold indicating the first fail allowable error range defined in the single sensor based on the current position determination result. For example, the fail-safe diagnosis module 130 may determine that the fail-safe diagnosis for the single sensor is a fail, when the standard deviation exceeds the threshold, and determine that the fail-safe diagnosis for the single sensor is a success or the safe processing operation can be performed, when the standard deviation is equal to or less than the threshold.

When it is determined that the fail-safe diagnosis for the single sensor is a success or the safe processing operation can be performed, the fail-safe diagnosis module 130 may analyze a second distribution chart including estimated position determination results obtained by predicting the most recently measured position determination results from composite sensors including the single sensor at the current point of time, and perform a fail-safe diagnosis for the composite sensors, in step S530.

Specifically, the fail-safe diagnosis module 130 may perform a fail-safe diagnosis for the composite sensors based on a result obtained by comparing and analyzing the standard deviation of the second distribution chart and the threshold indicating the second fail allow error range defined in advance. For example, the fail-safe diagnosis module 130 may determine that the fail-safe diagnoses for all of the composite sensors are fails, when the standard deviation exceeds the threshold, and determine that the fail-safe diagnoses for all of the composite sensors are successes, when the standard deviation is equal to or less than the threshold.

Then, when the fail-safe diagnoses for all of the composite sensors are completed, the fail-safe diagnosis module 130 may output the diagnosis result in step S540.

The diagnosis result may be outputted in the form of a message which can be classified into four stages of fail levels Level0 to Level3.

Level0 may indicate the case in which the position determination results are normal. That is, Level0 may indicate the case in which the initial diagnosis and the fail-safe diagnoses for the single sensors and the composite sensor are all determined to be successes.

Level1 may indicate the case in which an abnormality occurred. That is, Level1 may indicate the case in which the distribution region $\hat{P}_k$ of the estimated position determination results in the fail-safe diagnoses for the single sensors partially overlaps the fail allowable error range 30. Level2 may indicate the case in which a fail which can be recovered through the safe processing operation occurred during the fail-safe diagnosis. Level 3 may indicate the case in which a fail which cannot be recovered through the safe processing operation occurred. When a fail occurs at Levels0, Level1 and Level2, the position determination results may be available. However, when a fail occurs at Level3, the position determination result may not be available, and the system may perform the initial diagnosis again.

It should be understood that the block diagram of FIG. 1 illustrating the autonomous traveling system with a fail-safe function specifies the principle of the present invention in terms of function. Similarly, it should be understood that the flowchart of FIG. 5 shows various processes performed by a computer or processor, regardless of whether the flowchart can be substantially expressed through a computer readable medium or the computer or processor is clearly illustrated.

The blocks of FIG. 1, which are illustrated as a processor or a concept similar to the processor, may be provided as the use of dedicated hardware and hardware capable of executing software.

When the blocks of FIG. 1 are implemented by a processor, the functions of the blocks illustrated in FIG. 1 may be provided by a single dedicated processor, a single shared processor or a plurality of individual processors, and some of the blocks may be shared.

However, the fail-safe function described with reference to FIGS. 1 to 5 is performed under the supposition that a fail in DR information serving as reference information is not sensed and the DR information is an unconditional true value. Therefore, wrong DR information is likely to be used. As a result, the reliability of the fail-safe function may be degraded.

For reference, the DR information may indicate sensing information used for the DR method. The DR method may indicate a method for estimating the position and route of a vehicle using information sensed through the plurality of sensors mounted in the vehicle, when the vehicle enters a shaded area such as a tunnel or basement parking lot, where a GPS signal cannot be received. However, as the application time of the DR increases, drift errors of the sensors may be accumulated to infinity.

Therefore, the present embodiment provides an apparatus and method for ensuring a fail-safe function of an autonomous traveling system, which can monitor a fail in DR information and prevent utilization of wrong information in advance, thereby further ensuring and improving the reliability of the fail-safe function in an autonomous traveling system having a fail-safe function using the DR information.

Figure 6:
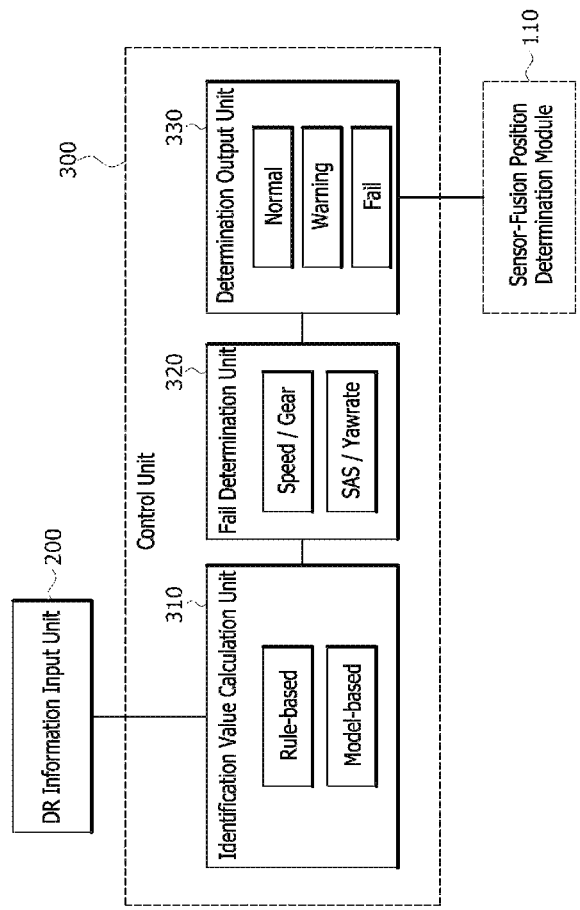
FIG. 6 is a diagram illustrating a schematic configuration of an apparatus for ensuring a fail-safe function of an autonomous traveling system in accordance with an embodiment of the present invention.

FIG. 6 is a diagram illustrating a schematic configuration of an apparatus for ensuring a fail-safe function of an autonomous traveling system in accordance with an embodiment of the present invention.

Referring to FIG. 6, the apparatus for ensuring a fail-safe function of an autonomous traveling system in accordance with the embodiment of the present invention may include a DR information input unit 200, an identification value calculation unit 310, a fail determination unit 320 and a determination result output unit 330.

Hereafter, in the present embodiment, the functions of the identification value calculation unit 310, the fail determination unit 320 and the determination result output unit 330 will be described as separate components for the convenience of description. However, it should be noted that the functions of the identification value calculation unit 310, the fail determination unit 320 and the determination result output unit 330 may be performed together by the control unit 300.

The DR information input unit 200 may receive information of a plurality of vehicle sensors mounted in the vehicle and gear information. The plurality of vehicle sensors may include an SAS (Steering Angle Sensor), a wheel speed sensor and a YRS (Yaw Rate Sensor).

The identification value calculation unit 310 may calculate an identification value (or diagnosis value) for determining whether each piece of sensing information inputted through the DR information input unit 200 is a fail.

The identification value calculation unit 310 may calculate an identification value for determining whether the sensing information is a fail, using two kinds of methods (for example, a rule-based method and a model-based method).

Figure 7:
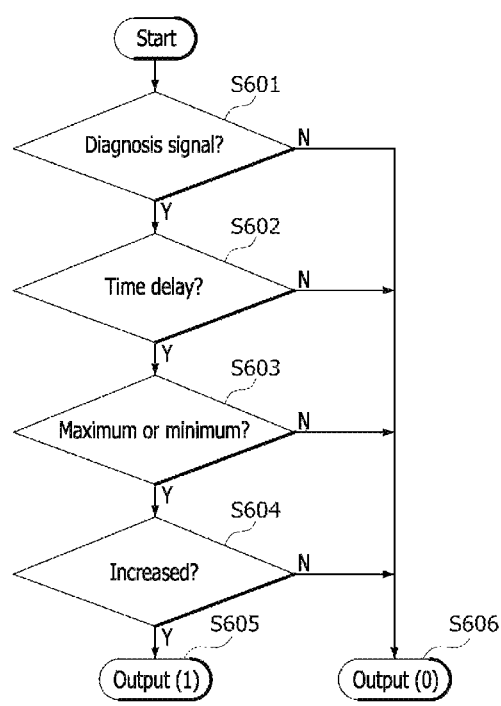
FIG. 7 is a diagram for describing a rule-based method through which an identification value calculation unit calculates an identification value in FIG. 6.

FIG. 7 is a diagram for describing the rule-based method through which the identification value calculation unit calculates an identification value in FIG. 6.

Referring to FIG. 7, the rule-based method may include outputting a designated identification value (for example, 1 or 0) by determining whether a plurality of preset conditions (for example, a sensor diagnosis signal, a measurement signal delay, a maximum/minimum value and an increment value) are satisfied for sensing information inputted through the DR information input unit 200.

For example, when the DR information is inputted, the identification value calculation unit 310 may check whether the input DR information, i.e. sensing information, is a normal diagnosis signal containing no noise, in step S601.

When the check result indicate that the DR information is not a normal diagnosis signal (No in step S601), the identification value calculation unit 310 may output a preset error identification value (for example, 0) in step S606.

On the other hand, when the check result indicates that the DR information is a normal diagnosis signal (Yes in step S601), the identification value calculation unit 310 may calculate a time required until the DR information, i.e. sensing information, is collected and check whether a time delay occurred by a designed specific time or more, in step S602.

When the check result indicates that a time delay occurred by the specific time or more (No in step S602), the identification value calculation unit 310 may output a preset error identification value (for example, 0) in step S606.

On the other hand, when the check result indicates that a time delay did not occur by the designated specific time or more (Yes in step S602), the identification value calculation unit 310 may check whether the DR information, i.e. sensing information, is out of the range between a preset maximum value and a preset minimum value or corresponds to a value between the maximum value and the minimum value, in step S603.

When the check result of step S603 indicates that the DR information is out of the range between the maximum value and the minimum value (No in step S603), the identification value calculation unit 310 may output the preset error identification value (for example, 0) in step S606.

When the check result of step S603 indicates that the DR information is not out of the range between the maximum value and the minimum value (Yes in step S603), the identification value calculation unit 310 may check whether the DR information, i.e. sensing information, is a value that has been increased by more than a preset increment or increased by the preset increment or less, in step S604.

When the check result of step S604 indicates that the DR information is a value that has been increased by more than the preset increment (No in step S604), the identification value calculation unit 310 may output the preset error identification value (for example, 0) in step S606.

When the check result of step S604 indicates that the DR information is not a value that has been increased by more than the preset increment (Yes in step S604), the identification value calculation unit 310 may output a preset normal identification value (for example, 1) in step S605.

As described above, the identification value calculation unit 310 may output the normal identification value (for example, 1) when the plurality of preset conditions (for example, the sensor diagnosis signal, the measurement time delay, the maximum/minimum value and the increment value) are all satisfied for the sensing information inputted through the DR information input unit 200, and output the error identification value (for example, 0) when any one of the plurality of preset conditions is not satisfied.

Figure 8:
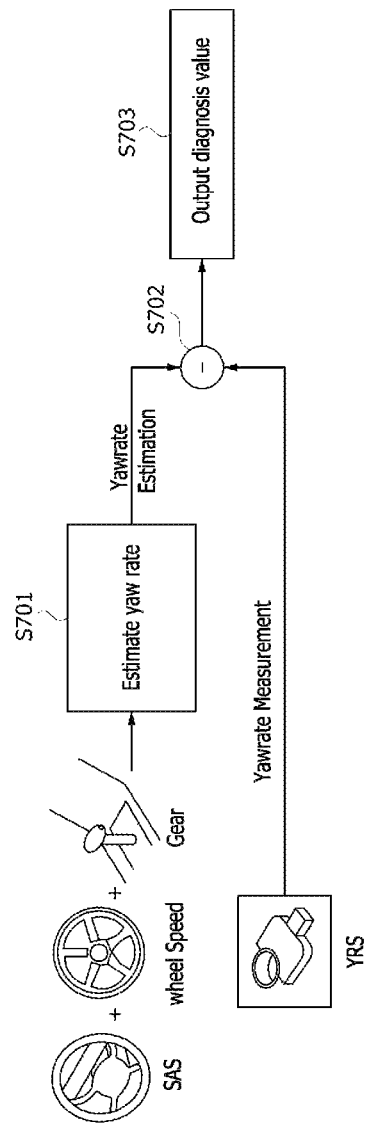
FIG. 8 is a diagram for describing a model-based method through which the identification value calculation unit calculates an identification value in FIG. 6.

FIG. 8 is a diagram for describing the model-based method through which the identification value calculation unit calculates an identification value in FIG. 6.

Referring to FIG. 8, the model-based method may include estimating (predicting) a measurement value of a specific sensor (for example, a YRS) based on a mathematical model in step S701, comparing an estimation value obtained by estimating the measurement value of the specific sensor to an actual measurement value collected by the specific sensor in step S702, and outputting a value corresponding to a difference therebetween, that is, a difference value or diagnosis value in step S703.

For reference, the measurement value of the specific sensor (for example, a YRS) may be estimated (predicted) by Equation 1 below, and the difference value may be calculated by Equation 2 below.

$$\psi_{est} = \frac{\sin(\theta_{SA}/G_{SAS})}{l_{wheel}} \times V_{wheel} \times D_{gear} \qquad \text{[Equation 1]}$$

$$T_{test} = |\psi_{raw} - \psi_{est}| \qquad \text{[Equation 2]}$$

In Equations 1 and 2, $\theta_{SA}$ represents a steering wheel angle, $G_{SAS}$ represents a gear ratio, $l_{wheel}$ represents a wheel length, $V_{wheel}$ represents a wheel speed, $\psi_{est}$ represents a yaw rate estimation value, $\psi_{raw}$ represents a yaw rate measurement value, $D_{gear}$ represents a direction, and $T_{test}$ represents a difference value (test statistics).

As described above, a measurement value in the model-based method is detected through the YRS, and three pieces of sensing information among four pieces of sensing information inputted through the DR information input unit 200 may be adjusted to calculate a yaw rate estimation value. Then, a difference value between the actual measurement value of the YRS and the estimation value may be outputted as the final identification value.

The fail determination unit 320 may determine whether the four pieces of sensing information inputted through the DR information input unit 200 are fails, using the identification value calculated by the identification value calculation unit 310.

For example, the fail determination unit 320 may determine whether the four pieces of sensing information are normal, when the identification value outputted from the identification value calculation unit 310 is 1, and determine whether the four pieces of sensing information are fails or errors, when the identification value is 0.

Since it is impossible to determine whether the value (difference value) calculated through the model-based method is a fail, the final identification value (for example, 1 or 0) may be outputted depending on whether the difference value exceeds a designated threshold. Therefore, the fail determination unit 320 may determine that the difference value is normal, when the final identification value outputted from the identification value calculation unit 310 is 1, and determine that the difference value is a fail or error, when the identification value is 0.

At this time, the threshold may be calculated through Equation 3 below.

$$T_{threshold} = M_{yaw}\psi_{raw} + M_{speed}V_{wheel} + \sigma_{yrs}$$ [Equation 3]

In Equation 3, $\sigma_{yrs}$ represents YRS noise, $T_{test}$ represents the difference value, $T_{threshold}$ represent the threshold, $M_{yaw}$ represents a margin of the YRS, and $M_{speed}$ represents a margin of the wheel speed sensor.

At this time, the margins of the YRS and the wheel speed sensor are tuning parameters capable of deciding the sensitivity of fail determination.

The determination result output unit 330 may output the fail determination result obtained through the fail determination unit 320.

At this time, when a fail occurs in any one piece of information among plural pieces of sensing information of the plurality of sensors (four sensors), inputted through the DR information input unit 200, the DR information at the corresponding point of time cannot be used because the DR information is utilized as reference information of a final position determination result.

For example, the determination result output unit 330 may output the fail determination result as normal when the fail determination unit 320 determines that all of the is plural pieces of sensing information of the plurality of sensors (four sensors), inputted through the DR information input unit 200, are normal, output the fail determination result as a warning when the results determined through the model-based method are close to the threshold within a designated range while the results determined through the rule-based method are all normal, and output the fail determination result as a fail when a fail occurs in one or more of the sensors (one or more pieces of sensing information).

The result outputted by the determination result output unit 330 (for example, normal, warning or fail) may be outputted to the sensor-fusion position determination module 110 described with reference to FIG. 1. Thus, when the result is finally outputted as a fail, the DR information at this point of time may not be utilized for the fail/safe function of map matching, which makes it possible to further ensure and improve the reliability of the fail-safe function.

Figure 9:
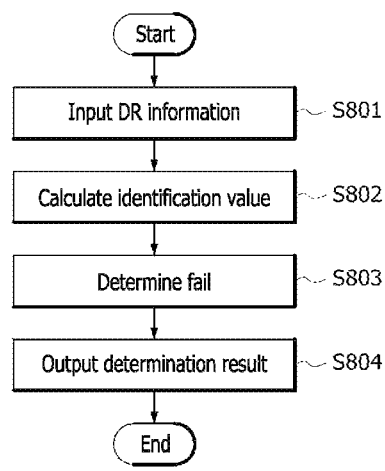
FIG. 9 is a flowchart illustrating a method for ensuring a fail-safe function of an autonomous traveling system in accordance with an embodiment of the present invention.

FIG. 9 is a flowchart illustrating a method for ensuring a fail-safe function of an autonomous traveling system in accordance with an embodiment of the present invention.

As illustrated in FIG. 9, the control unit 300 may receive plural pieces of DR information (for example, SAS information, wheel speed sensor information, YRS information and gear information) through the DR information input unit 200 in step S801.

The control unit 300 may calculate an identification value for determining whether each piece of sensing information inputted through the DR information input unit 200 is a fail.

At this time, the control unit 300 may calculate an identification value for determining whether the sensing information is a fail, using the above-described two methods (for example, the rule-based method and the model-based method).

Through the rule-based method, the control unit 300 may output the normal identification value (for example, 1) when the plurality of preset conditions (for example, the sensor diagnosis signal, the measurement time delay, the maximum/minimum value and the increment) are all satisfied for the sensing information inputted through the DR information input unit 200, and output the error identification value (for example, 0) when any one of the plurality of preset conditions is not satisfied.

Furthermore, through the model-based method, the control unit 300 may estimate (predict) a measurement value of a specific sensor (for example, the YRS), compare an estimation value obtained by estimating the measurement value of the specific sensor to an actual measurement value collected by the specific sensor, and output a value corresponding to a difference therebetween, that is, a difference value.

Since it is impossible to determine whether the value (difference value) calculated through the model-based method is a fail, the final identification value (for example, 1 or 0) may be outputted depending on whether the difference value exceeds the designated threshold.

The control unit 300 may determine whether the plural pieces of sensing information of the plurality of sensors, inputted through the DR information input unit 200, are fails, using the calculated identification value, in step S803.

For example, the fail determination unit 320 may determine that the plural pieces of sensing information are normal, when the identification value outputted from the identification value calculation unit 310, i.e. the final identification value, is 1, and determine that the plural pieces of sensing information are fails or errors, when the identification value is 0.

The control unit 300 may output the fail determination result in step S804.

For example, the control unit 300 may output the fail determination result as is normal when all of the plural pieces of sensing information of the plurality of sensors (four sensors), inputted through the DR information input unit 200, are determined to be normal, output the fail determination result as a warning when the results determined through the model-based method are close to the threshold while the results determined through the rule-based method are all normal, and output the fail determination result as a fail when a fail occurs in one or more of the sensors (one or more pieces of sensing information).

At this time, the output result (for example, normal, warning or fail) may be outputted to the sensor-fusion position determination module 110 described with reference to FIG. 1. Thus, when the result is finally outputted as a fail, the DR information at this point of time may not be utilized for the fail/safe function of map matching, which makes it possible to further ensure and improve the reliability of the fail-safe function.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for ensuring a fail-safe function of an autonomous traveling system, comprising:
a dead reckoning (DR) information input unit configured to receive pieces of sensing information outputted from a plurality of sensors mounted in a vehicle as DR information;
an identification value calculation unit configured to calculate an identification value for determining whether the respective pieces of sensing information inputted through the DR information input unit are fails; and
a fail determination unit configured to determine whether the pieces of sensing information inputted through the DR information input unit are fails, using the identification value calculated through the identification value calculation unit,
wherein the identification value calculation unit is configured to calculate the identification value for determining whether the pieces of sensing information are fails, using a rule-based method,
wherein the identification value calculation unit is further configured to calculate the identification value for determining whether the pieces of sensing information are fails, using a model-based method.

2. The apparatus of claim 1, wherein according to the model-based method, the identification value calculation unit is configured to estimate a measurement value of a YRS designated as a specific sensor through Equation 1 below, to compare an estimation value obtained by estimating the measurement value of the YRS to an actual measurement value collected by the YRS, to output a difference value corresponding to a difference therebetween, and to output a normal identification value or an error identification value as a final identification value depending on whether the difference value exceeds a designated threshold:

$$\psi_{est} = \frac{\sin(\theta_{SA}/G_{SAS})}{l_{wheel}} \times V_{wheel} \times D_{gear} \qquad \text{[Equation 1]}$$

wherein $\theta_{SA}$ represents a steering wheel angle, $G_{SAS}$ represents a gear ratio, $l_{wheel}$ represents a wheel length, $V_{wheel}$ represents a wheel speed, $\psi_{est}$ represents a yaw rate estimation value, and $D_{gear}$ represents a direction.

3. The apparatus of claim 1, further comprising a determination result output unit configured to output a fail determination result as: a warning in response to results determined through the model-based method being close to a threshold within a designated range while results determined through the rule-based method are normal.

4. An apparatus for ensuring a fail-safe function of an autonomous traveling system, comprising:
a dead reckoning (DR) information input unit configured to receive pieces of sensing information outputted from a plurality of sensors mounted in a vehicle as DR information;
an identification value calculation unit configured to calculate an identification value for determining whether the respective pieces of sensing information inputted through the DR information input unit are fails; and
a fail determination unit configured to determine whether the pieces of sensing information inputted through the DR information input unit are fails, using the identification value calculated through the identification value calculation unit,
wherein the identification value calculation unit is configured to calculate the identification value for determining whether the pieces of sensing information are fails, using a rule-based method, and
wherein according to the rule-based method, the identification value calculation unit is configured to output a normal identification value when a plurality of preset conditions are all satisfied for each of the pieces of sensing information inputted through the DR information input unit, and to output an error identification value when any one of the plurality of preset conditions is not satisfied.

5. The apparatus of claim 4, wherein the plurality of conditions comprise at least one of:
whether the pieces of sensing information are normal diagnosis signals containing no noise;
whether time required until the pieces of sensing information is collected is delayed by a designed specific time or more;
whether the pieces of sensing information are out of a range between a preset maximum value and a preset minimum value; and
whether the pieces of sensing information are values that have been increased by more than a preset increment.

6. A method for ensuring a fail-safe function of an autonomous traveling system, comprising:
receiving, by a control unit, pieces of sensing information outputted from a plurality of sensors mounted in a vehicle as dead reckoning (DR) information;
calculating, by the control unit, an identification value for determining whether the respective pieces of sensing information received as the DR information are fails; and
determining, by the control unit, whether the pieces of sensing information received as the DR information are fails, using the calculated identification value,
wherein the control unit is configured to calculate the identification value for determining whether the sensing information is a fail, using a rule-based method,
wherein according to the rule-based method, the control unit is configured to output a normal identification value when a plurality of preset conditions are all satisfied for each of the pieces of sensing information inputted as the DR information, and to output an error identification value when any one of the plurality of preset conditions is not satisfied.

7. The method of claim 6, wherein the plurality of conditions comprise at least one of:
whether the pieces of sensing information are normal diagnosis signals containing no noise;
whether time required until the pieces of sensing information are collected is delayed by a designed specific time or more;
whether the pieces of sensing information are out of a range between a preset maximum value and a preset minimum value; and
whether the pieces of sensing information are values that have been increased by more than a preset increment.

8. A method for ensuring a fail-safe function of an autonomous traveling system, comprising:

receiving, by a control unit, pieces of sensing information outputted from a plurality of sensors mounted in a vehicle as dead reckoning (DR) information;

calculating, by the control unit, an identification value for determining whether the respective pieces of sensing information received as the DR information are fails; and determining, by the control unit, whether the pieces of sensing information received as the DR information are fails, using the calculated identification value, wherein the control unit is configured to calculate the identification value for determining whether the sensing information is a fail, using a rule-based method, wherein the control unit is further configured to calculate the identification value for determining whether the sensing information is a fail, using a model-based method.

9. The method of claim 8, wherein according to the model-based method, the control unit is configured to estimate a measurement value of a YRS designated as a specific sensor through Equation 1 below, to compare an estimation value obtained by estimating the measurement value of the YRS to an actual measurement value collected by the YRS, to output a difference value corresponding to a difference therebetween, and to output a normal identification value or an error identification value as a final identification value depending on whether the difference value exceeds a designated threshold:

$$\psi_{est} = \frac{\sin(\theta_{SA}/G_{SAS})}{l_{wheel}} \times V_{wheel} \times D_{gear} \qquad \text{[Equation 1]}$$

where $\theta_{SA}$ represents a steering wheel angle, $G_{SAS}$ represents a gear ratio, $l_{wheel}$ represents a wheel length, $V_{wheel}$ represents a wheel speed, $\psi_{est}$ represents a yaw rate estimation value, and $D_{gear}$ represents a direction.

10. The method of claim 8, wherein the control unit is configured to output a fail determination result as: a warning in response to results determined through the model-based method being close to a threshold within a designated range while results determined through the rule-based method are normal.

* * * * *